United States Patent
Wang et al.

(10) Patent No.: US 11,976,950 B2
(45) Date of Patent: May 7, 2024

(54) THIN FILM SENSOR, THIN FILM SENSOR ARRAY, AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Long Wang, Beijing (CN); Dongdong Zhang, Beijing (CN); Yafei Zhang, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 260 days.

(21) Appl. No.: 17/515,298

(22) Filed: Oct. 29, 2021

(65) Prior Publication Data
US 2022/0268603 A1 Aug. 25, 2022

(30) Foreign Application Priority Data
Feb. 23, 2021 (CN) .......................... 202110202478.2

(51) Int. Cl.
*G01D 5/24* (2006.01)
*H01Q 1/40* (2006.01)

(52) U.S. Cl.
CPC ................. *G01D 5/24* (2013.01); *H01Q 1/40* (2013.01)

(58) Field of Classification Search
CPC .................................. G01D 5/24; H01Q 1/40
See application file for complete search history.

(56) References Cited

U.S. PATENT DOCUMENTS

| 2009/0051620 A1* | 2/2009 | Ishibashi | H01Q 9/16 343/897 |
| 2012/0024132 A1* | 2/2012 | Wallace | G10H 1/183 84/689 |
| 2020/0316483 A1* | 10/2020 | Reese | H03K 17/9622 |

FOREIGN PATENT DOCUMENTS

| CN | 110211975 A | 9/2019 |
| CN | 110660529 A | 1/2020 |
| CN | 111342222 A | 6/2020 |
| CN | 111355026 A | 6/2020 |

(Continued)

OTHER PUBLICATIONS

China Patent Office, First Office Action dated Apr. 17, 2023 for application No. CN202110202478.2.

*Primary Examiner* — Kenneth B Lee, Jr.
(74) *Attorney, Agent, or Firm* — HOUTTEMAN LAW LLC (57) ABSTRACT

The present disclosure provides a thin film sensor, a thin film sensor array and an electronic device. The thin film sensor has a functional area and a non-functional area surrounding the functional area, and includes: a dielectric substrate having a first surface and a second surface which are oppositely arranged; a first conductive layer located on the first surface of the dielectric substrate and including a first conductive structure arranged in the functional area; a second conductive layer located on the second surface of the dielectric substrate; a first light-shielding layer located on the first surface of the dielectric substrate, the first light-shielding layer includes a first light-shielding structure at least arranged in the non-functional area, the first light-shielding structure has the same pattern as the first conductive structure.

5 Claims, 4 Drawing Sheets

(56) References Cited

FOREIGN PATENT DOCUMENTS

| CN | 111462952 A | * | 7/2020 | ........... G06F 3/0412 |
|----|-------------|---|--------|---------------------------|
| CN | 111462952 A |   | 7/2020 | |
| CN | 210984952 U |   | 7/2020 | |
| JP | 2011065393 A |  | 3/2011 | |
| JP | 2015074147 A |  | 4/2015 | |
| JP | 2015176315 A |  | 10/2015 | |
| JP | 2016130913 A |  | 7/2016 | |
| JP | 2016184683 A |  | 10/2016 | |
| JP | 3221633 U   |  | 6/2019 | |

\* cited by examiner

THIN FILM SENSOR, THIN FILM SENSOR ARRAY, AND ELECTRONIC DEVICE

CROSS REFERENCE TO RELATED APPLICATIONS

This application claims the priority to Chinese patent application No. 202110202478.2 filed by the Chinese Intellectual Property Office on Feb. 23, 2021, the disclosure of which is incorporated herein by reference in its entirety.

TECHNICAL FIELD

The present disclosure relates to the field of communication technology, and particularly relates to a thin film sensor, a thin film sensor array and an electronic device.

BACKGROUND

With the development of internet of things and communication technologies, the demand of thin film sensors, such as thin film antennas, is increasing. In order to achieve a better integration with living scenarios, transparent antennas are favored. For example, the transparent antenna can be integrated with building glass, glass of rail transit vehicle or automobile glass and the like, which can facilitate to realize information transmission without influencing normal sight, so that interconnection of everything is realized, and life is more convenient and faster.

SUMMARY

In a first aspect, an embodiment of the present disclosure provides a thin film sensor having a functional area and a non-functional area surrounding the functional area, and the thin film sensor including:
  a dielectric substrate having a first surface and a second surface disposed opposite to each other;
  a first conductive layer located on the first surface of the dielectric substrate, the first conductive layer including a first conductive structure disposed in the functional area;
  a second conductive layer located on the second surface of the dielectric substrate; and
  a first light-shielding layer located on the first surface of the dielectric substrate, and the first light-shielding layer includes a first light-shielding structure at least disposed in the non-functional area, where the first light-shielding structure has the same pattern as the first conductive structure.

In some implementations, the first conductive layer further includes a first auxiliary conductive structure located in the non-functional area;
  the first auxiliary conductive structure is disconnected from the first conductive structure, and the first auxiliary conductive structure has the same pattern as the first conductive structure; and
  the first light-shielding structure covers the first conductive structure and the first auxiliary conductive structure.

In some implementations, breakpoints are provided in at least a portion of positions in the first auxiliary conductive structure.

In some implementations, the second conductive layer includes a second conductive structure arranged in the functional area; and the second conductive structure has the same pattern as the first conductive structure.

In some implementations, the thin film sensor further includes a second light-shielding layer located on the second surface of the dielectric substrate, and the second light-shielding layer includes a second light-shielding structure at least arranged in the non-functional area, where the second light-shielding structure has the same pattern as the second conductive structure.

In some implementations, the second conductive layer further includes a second auxiliary conductive structure arranged in the non-functional area;
  the second auxiliary conductive structure is disconnected from the second conductive structure, and the second auxiliary conductive structure has the same pattern as the second conductive structure; and
  the second light-shielding structure covers the second conductive structure and the second auxiliary conductive structure.

In some implementations, breakpoints are provided in at least a portion of positions in the second auxiliary conductive structure.

In some implementations, orthographic projections of the first light-shielding layer and the second light-shielding layer on the dielectric substrate are completely coincident, and orthographic projections of the first conductive layer and the second conductive layer on the dielectric substrate both fall within the orthographic projection of the first light-shielding layer on the dielectric substrate.

In some implementations, the second conductive layer includes a second conductive structure located in the functional area and the non-functional area; and
  the second conductive structure has the same pattern as the first conductive structure.

In some implementations, the thin film sensor further includes:
  a first planarization layer located on a side, away from the dielectric substrate, of the first light-shielding layer;
  a first protective layer located on a side, away from the dielectric substrate, of the first planarization layer;
  a second planarization layer located on a side, away from the dielectric substrate, of the second conductive layer; and
  a second protective layer located on a side, away from the dielectric substrate, of the second planarization layer.

In a second aspect, an embodiment of the present disclosure provides a thin film sensor array including a plurality of thin film sensors, each as provided above, arranged in an array.

In some implementations, first conductive layers in the thin film sensors are connected together; and
  second conductive layers in the thin film sensors are connected together.

In a third aspect, an embodiment of the present disclosure provides an electronic device including a thin film sensor array as provided above.

DETAILED DESCRIPTION

In order that those skilled in the art will better understand the technical solutions of the present disclosure, the following detailed description is given with reference to the accompanying drawings and the specific embodiments.

Unless defined otherwise, technical or scientific terms used herein shall have the ordinary meaning as understood by one of ordinary skill in the art to which this disclosure belongs. The use of "first," "second," and the like in this disclosure is not intended to indicate any order, quantity, or importance, but rather is used to distinguish one element from another. Also, the use of the terms "a," "an," or "the" and similar referents do not denote a limitation of quantity, but rather denote the presence of at least one. The word "includes" or "comprises", and the like, means that the element or item preceding the word includes the element or item listed after the word and its equivalent, but does not exclude other elements or items. The terms "connected" or "coupled" and the like are not restricted to physical or mechanical connections, but may include electrical connections, whether direct or indirect. Terms "upper/on", "lower/below", "left", "right", and the like are used only to indicate relative positional relationships, and when the absolute position of the object being described is changed, the relative positional relationships may also be changed accordingly.

In the related art, a conductive structure is arranged in a functional area of a transparent antenna, but no structure is arranged in a non-functional area of the transparent antenna, and due to the shielding effect of the conductive structure, the light transmittance of the functional area is different from that of the non-functional area, so that the visual effect of the functional area is obviously different from that of the non-functional area, and the use experience of a user is seriously influenced.

Figure 1:
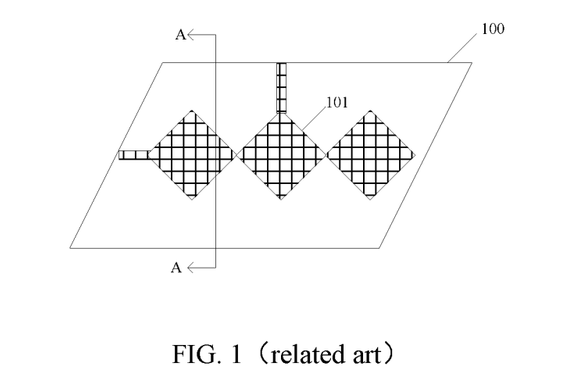
FIG. 1 is an exemplary schematic diagram of a thin film sensor of related art.
Figure 2:
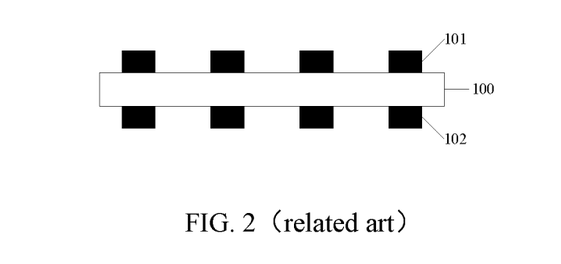
FIG. 2 is a schematic cross-sectional view of a structure of the thin film sensor of FIG. 1 taken along line A-A.

FIG. 1 is an exemplary schematic structural diagram of a thin film sensor in the related art, and as shown in FIG. 1, the thin film sensor has a functional area and a non-functional area surrounding the functional area. FIG. 2 is a schematic cross-sectional diagram of a structure of the thin film sensor shown in FIG. 1 taken along line A-A, and as shown in FIGS. 1 and 2, the thin film sensor includes: a dielectric substrate 100, the dielectric substrate 100 having a first surface and a second surface, i.e., an upper surface and a lower surface, which are oppositely arranged; a first conductive layer 101 and a second conductive layer 102, which are respectively located on the first surface and the second surface of the dielectric substrate 100, and located in the functional area. Taking the thin film sensor being a transparent antenna as an example, the first conductive layer 101 may be a radiation layer, and the second conductive layer 102 may be a ground layer, in order to ensure that the first conductive layer 101 and the second conductive layer 102 have good light transmittance, patterning process is usually performed on the first conductive layer 101 and the second conductive layer 102, for example, the first conductive layer 101 may be formed by grid lines made of a metal material, and the second conductive layer 102 may also be formed by grid lines made of a metal material. It is understood that the first conductive layer 101 and the second conductive layer 102 may also be block electrodes formed by other patterns, for example, diamond-shaped pattern, triangular pattern, etc., which are not listed here. As can be seen from FIG. 1, entire two surfaces (i.e., the first surface and the second surface) of the dielectric substrate 100 each are not covered by the first conductive layer 101 or the second conductive layer 102, that is, the first conductive layer 101 and the second conductive layer 102 each are formed into a grid line structure, since the first conductive layer 101 and the second conductive layer 102 block light, and the first conductive layer 101 and the second conductive layer 102 are not disposed in the non-functional area, the light transmittance of the functional area is different from that of the non-functional area, thereby causing a significant difference between visual effects of the functional area and the non-functional area, and seriously affecting the user experience.

In order to solve at least one of the above technical problems, embodiments of the present disclosure provide a thin film sensor, a thin film sensor array and an electronic device, and it is understood that the thin film sensor provided by embodiment of the present disclosure may be a transparent antenna, and may also be other types of thin film sensors, which are not listed here. The following describes the thin film sensor, the thin film sensor array, and the electronic device provided in the embodiments of the present disclosure in further detail by taking the transparent antenna as an example in conjunction with the drawings and the detailed implementations.

Figure 3:
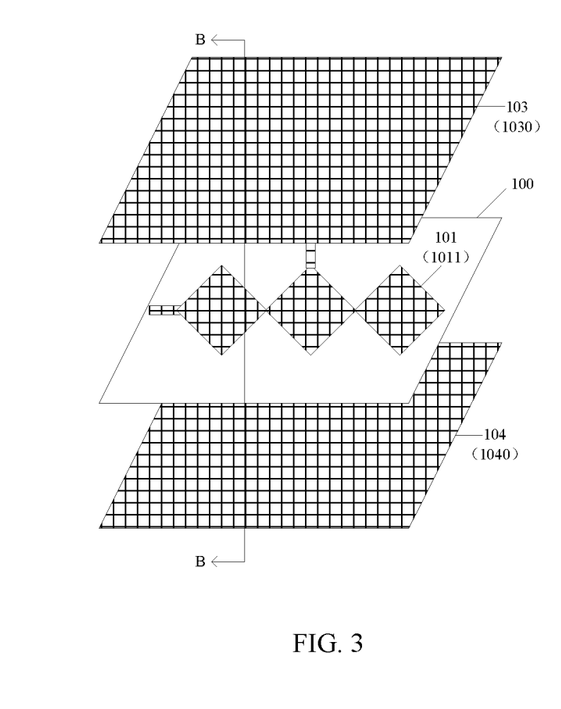
FIG. 3 is a schematic structural diagram of a thin film sensor according to an embodiment of the present disclosure.
Figure 4:
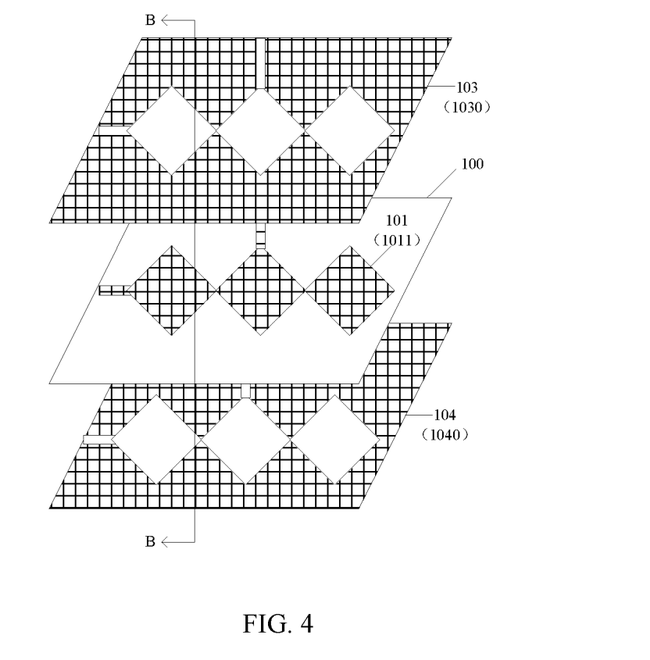
FIG. 4 is a schematic structural diagram of a thin film sensor according to an embodiment of the present disclosure.
Figure 5:
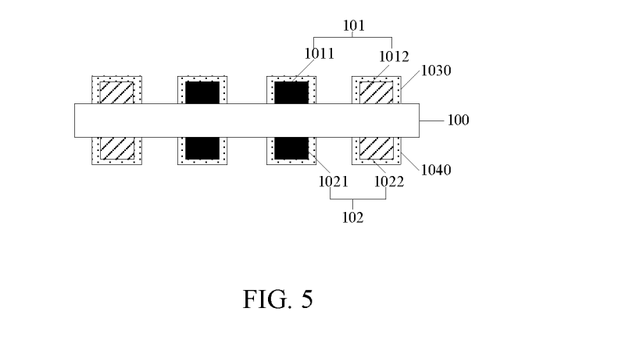
FIG. 5 is a schematic cross-sectional view of a structure of the thin film sensor shown in FIG. 3 taken along line B-B.
Figure 6:
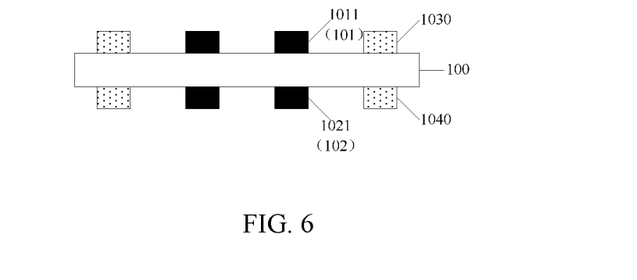
FIG. 6 is a schematic cross-sectional view of a structure of the thin film sensor shown in FIG. 4 taken along line C-C.

In a first aspect, an embodiment of the present disclosure provides a thin film sensor, FIG. 3 is a schematic structural diagram of a thin film sensor provided in an embodiment of the present disclosure, and FIG. 4 is another schematic structural diagram of a thin film sensor provided in an embodiment of the present disclosure, as shown in FIG. 3 and FIG. 4, the thin film sensor has a functional area and a non-functional area surrounding the functional area. FIG. 5 is a schematic cross-sectional diagram of a structure of the thin film sensor shown in FIG. 3 taken along line B-B, and FIG. 6 is a schematic cross-sectional diagram of a structure of the thin film sensor shown in FIG. 4 taken along line C-C, as shown in FIGS. 3, 4, 5 and 6, the thin film sensor includes: a dielectric substrate 100; a first conductive layer 101; a second conductive layer 102; and a first light-shielding layer 103. The dielectric substrate 100 has a first surface and a second surface which are oppositely disposed. The first conductive layer 101 is located on the first surface of the dielectric substrate 100, and the first conductive layer 101 includes a first conductive structure 1011 disposed in the functional area. The second conductive layer 102 is located on the second surface of the dielectric substrate 100. The first light-shielding layer 103 is located on the first surface of the dielectric substrate 100, and the first light-shielding layer 103 includes a first light-shielding structure 1030 at least disposed in the non-functional area, where the first light-shielding structure 1030 has the same pattern as the first conductive structure 1011.

In some implementations, the dielectric substrate 100 is located between the first conductive layer 101 and the second conductive layer 102, and may be made of a low-loss dielectric material, for supporting the first conductive layer 101 and the second conductive layer 102. The dielectric substrate 100 may be a flexible substrate or a rigid substrate, and when the dielectric substrate 100 is conformal with other objects, in order to achieve good bending performance, the dielectric substrate 100 is preferably a flexible substrate, and the material thereof may include a transparent flexible material such as polyimide, polyethylene terephthalate, or polyethylene.

The first conductive layer 101 and the second conductive layer 102 may be made of a metal material such as aluminum, copper, or molybdenum, and have good conductive performance and good bending performance, so as to bend along with the flexible substrate, and a better conformality with other objects is achieved. It is understood that the material of the first conductive layer 101 and the second conductive layer 102 may also be other transparent non-metal conductive materials, such as Indium Tin Oxide (ITO), and the like, which are not listed here. In general, the first conductive layer 101 and the second conductive layer 102 need to be subjected to a patterning process, and the pattern of the first conductive layer 101 and the pattern of the second conductive layer 102 are the same. For example, the first conductive layer 101 may be formed by grid lines made of a metal material, and the second conductive layer 102 may also be formed by grid lines made of a metal material, so that light can penetrate through gaps between the grid lines in the first conductive layer 101 and the second conductive layer 102 to ensure that the first conductive layer 101 and the second conductive layer 102 have good light transmittance. It should be noted that, in the following description of the present disclosure, different structures having a same pattern may also be arranged in the above manner, and will not be described in detail.

The first light-shielding layer 103 may be made of a light-shielding material such as photoresist, and has a thickness ranging from 1 μm to 2 μm. The first light-shielding layer 103 may be formed as a first light-shielding structure 1030 having the same pattern as the first conductive structure 1011 through a patterning process. In the embodiment of the present disclosure, the first light-shielding layer 103 may be only disposed in the non-functional area, and may not be coupled to the first conductive layer 101, and thus, the material of the first light-shielding layer 103 may also be a metal material such as aluminum, copper, or molybdenum. Certainly, the material of the first light-shielding material 103 may also be other non-transparent materials, which are not listed here. In practical applications, similar to the first conductive layer 101 and the second conductive layer 102, the first light-shielding layer 103 also needs to be patterned, and the pattern of the first light-shielding layer 103 is the same as the pattern of the first conductive layer 101, for example, the first light-shielding layer 103 may also be formed by grid lines, so that light can pass through gaps between the grid lines to ensure the light transmittance of the whole thin film sensor.

In the thin film sensor provided in the embodiment of the present disclosure, the first conductive layer 101 and the second conductive layer 102 are disposed opposite to each other, and can convert an electrical signal into an electromagnetic signal, or convert an electromagnetic signal into an electrical signal, so as to implement functions of radiation and reception of signals. On the first surface of the dielectric substrate 100, the first conductive layer 101 includes the first conductive structure 1011, and the first light-shielding layer 103 includes the first light-shielding structure 1030. In a case where the first light-shielding layer 103 is only provided in the non-functional area (as shown in FIGS. 4 and 6), a user can see the first conductive structure 1011 and the first light-shielding structure 1030 when viewing toward the first surface of the dielectric substrate 100. Because the first light-shielding structure 1030 has the same pattern as the first conductive structure 1011, the light transmittance in the functional area and the non-functional area is more uniform, so that structures of the functional area and the non-functional area have no obvious difference in visual effect, and the visual experience of the user can be improved. In a case where the first light-shielding layer 103 is disposed in both the non-functional area and the functional area (as shown in FIGS. 3 and 5), the first light-shielding layer 103 may cover the first conductive layer 101 in the functional area, so that only the first light-shielding structure 1030 can be seen by a user when viewed toward the first surface of the dielectric substrate 100. Therefore, the light transmittance in the functional area and the non-functional area is more uniform, so that the structures of the functional area and the non-functional area have no obvious difference in visual effect, and the visual experience of the user can be improved. Moreover, the thin film sensor provided by the embodiment of the present disclosure has a simple structure, which results in a relatively lower preparation cost.

In some implementations, as shown in FIGS. 3 and 5, the first conductive layer 101 further includes: a first auxiliary conductive structure 1012 (not shown in FIG. 3) disposed in the non-functional area; the first auxiliary conductive structure 1012 and the first conductive structure 1011 are disconnected from each other, and the first auxiliary conductive structure 1012 and the first conductive structure 1011 have the same pattern; the first light-shielding structure 1030 covers the first conductive structure 1011 and the first auxiliary conductive structure 1012.

It should be noted that, in the thin film sensor shown in FIGS. 3 and 5, the first light-shielding layer 103 is disposed in the functional area and the non-functional area, the first light-shielding layer 103 includes a first light-shielding structure 1030 composed of a plurality of grid lines, the first light-shielding structure 1030 covers the first conductive structure 1011, and in a case where the first conductive structure 1011 is disposed in the functional area but is not disposed in the non-functional area, a height difference exists at a boundary between the non-functional area and the functional area, so that the first light-shielding layer 103 also has a height difference at a boundary between the non-functional area and the functional area. When a thickness of the first conductive layer 101 is less than 1 micrometer, the visual difference caused by the height difference is not obvious, however, when the thickness of the first conductive layer 101 is more than 1 micrometer, the visual difference caused by the height difference is relatively obvious, and the visual effect is influenced. The non-functional area in the thin film sensor shown in FIGS. 3 and 5 is provided with the first auxiliary conductive structure 1012, and since the first auxiliary conductive structure 1012 has the same pattern as the first conductive structure 1011, thicknesses of film layers in the functional area and the non-functional area can be the same, and the height difference at the boundary between the functional area and the non-functional area can be avoided, so that the height difference of the first light-shielding layer 103 at the boundary between the functional area and the non-functional area can be avoided, and the visual experience of the user can be improved. In the embodiment of the present disclosure, the first auxiliary conductive structure 1012 may be disposed in the non-functional area, and may not be connected to the first conductive structure 1011, and therefore, the material of the first auxiliary conductive structure 1012 in the first conductive layer 101 may be a metal material such as aluminum, copper or molybdenum, or other materials without conductive property, which is not listed here.

Figure 7:
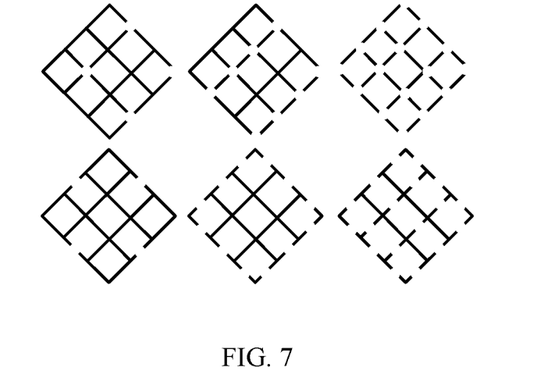
FIG. 7 is a schematic structural diagram of a first auxiliary conductive structure in a thin film sensor according to an embodiment of the present disclosure.

FIG. 7 is a schematic structural diagram of the first auxiliary conductive structure 1012 in the thin film sensor according to an embodiment of the present disclosure, and as shown in FIG. 7, at least a portion of positions of the first auxiliary conductive structure 1012 are provided with breakpoints.

In some implementations, as shown in FIG. 7, the first auxiliary conductive structure 1012 may also be composed of grid lines, and the material thereof may be metal or other material without conductive property. Breakpoints in the first auxiliary conductive structure 1012 may be arranged at intersection positions of the grid lines and may also be arranged at other positions, and the number of the breakpoints of each grid line may be set according to actual needs. It is understood that the breakpoints of the first auxiliary conductive structure 1012 may be located at other positions besides the six positions shown in FIG. 7, which are not listed here. The first auxiliary conductive structure 1012 being provided with the breakpoints can ensure that the first auxiliary conductive structure 1012 is broken off, so that the first conductive layer 101 in the non-functional area cannot transmit a current, and interference thereof on the signal in the first conductive structure 1011 in the functional area is avoided.

In some implementations, as shown in FIGS. 3, 4, 5, and 6, the second conductive layer 102 includes a second conductive structure 1021 arranged in the functional area, where the second conductive structure 1021 has the same pattern as the first conductive structure 1011, that is, each of the first conductive layer 1011 and the second conductive structure 1021 is formed of a plurality of grid lines.

It should be noted that, the second conductive layer 102 may include the second conductive structure 1021 arranged in the functional area, and the second conductive structure 1021 has the same pattern as the first conductive structure 1011, when viewed towards the first surface of the dielectric substrate 100, the first conductive structure 1011 may shield the second conductive structure 1021, and a user may see the first conductive structure 1011 and the first light-shielding structure 1030, or may see only the first light-shielding structure 1030. Because the first light-shielding structure 1030 has the same pattern as the first conductive structure 1011, the light transmittance in the functional area and the non-functional area is more uniform, so that the structures of the functional area and the non-functional area have no obvious difference in visual effect, and the visual experience of the user can be improved.

In some implementations, as shown in FIGS. 3, 4, 5, and 6, the thin film sensor further includes a second light-shielding layer 104 located on the second surface of the dielectric substrate 100, the second light-shielding layer 104 includes a second light-shielding structure 1040 disposed at least in the non-functional area, where the second light-shielding structure 1040 and the second conductive structure 1021 have the same pattern, for example, both of them are of a grid line structure, that is, both of the second light-shielding structure 1040 and the second conductive structure 1021 are composed of a plurality of grid lines.

On the second surface of the dielectric substrate 100, the second conductive layer 102 includes the first conductive structure 1021, and the second light-shielding layer 104 includes a second light-shielding structure 1040. In a case where the second light-shielding layer 104 is only disposed in the non-functional area (as shown in FIGS. 4 and 6), a user can see the second conductive structure 1021 and the second light-shielding structure 1040 when viewing towards the second surface of the dielectric substrate 100. Since the second light-shielding structure 1040 and the second conductive structure 1021 each have the same pattern as the first conductive structure 1011, the light transmittance in the functional area and the non-functional area is more uniform, so that the structures in the functional area and the non-functional area have no obvious difference in visual effect, and the visual experience of the user can be improved. In a case where the second light-shielding layer 104 is disposed in the non-functional area and the functional area (as shown in FIGS. 3 and 5), the second light-shielding layer 104 may cover the second conductive layer 102, and a user may only see the second light-shielding structure 1040 when viewing toward the second surface of the dielectric substrate 100. Therefore, the light transmittance in the functional area and the non-functional area is more uniform, so that the structures in the functional area and the non-functional area have no obvious difference in visual effect, and the visual experience of the user can be improved.

In some implementations, as shown in FIGS. 3 and 5, the second conductive layer 102 further includes a second auxiliary conductive structure 1022 (not shown in FIG. 3) disposed in the non-functional area, the second auxiliary conductive structure 1022 and the second conductive structure 1021 are disconnected from each other, and the patterns of the second auxiliary conductive structure 1022 and the second conductive structure 1021 are the same, that is, both the second auxiliary conductive structure 1022 and the second conductive structure 1021 are composed of grid lines, and the second light-shielding structure 1040 covers the second conductive structure 1021 and the second auxiliary conductive structure 1022.

Also, at least a portion of positions in the second auxiliary conductive structure 1012 are provided with breakpoints.

In some implementations, the second auxiliary conductive structure 1012 may also be composed of grid lines, and the material thereof may be metal or other materials without conductive property. Breakpoints in the second auxiliary conductive structure 1012 may be arranged at the intersection positions of the grid lines and may also be arranged at other positions, and the number of the breakpoints of each grid line may be set according to actual needs. The second auxiliary conductive structure 1022 being provided with the breakpoints can ensure that the second auxiliary conductive structure 1022 is broken off, so that the second conductive layer 102 in the non-functional area cannot transmit a current, and interference thereof on the signal in the second conductive structure 1021 in the functional area is avoided.

It should be noted that, in the thin film sensor shown in FIGS. 3 and 5, the second light-shielding layer 104 is disposed in the functional area and the non-functional area, the second light-shielding layer 104 includes a second light-shielding structure 1040 composed of a plurality of grid lines, the second light-shielding structure 1040 covers the second conductive structure 1021, and in a case where the second conductive structure 1021 is disposed in the functional area but is not disposed in the non-functional area, a height difference exists at a boundary between the functional area and the non-functional area, so that the second light-shielding layer 104 also has a height difference at the boundary between the functional area and the non-functional area. When a thickness of the second conductive layer 102 is less than 1 micrometer, the visual difference caused by the height difference is not obvious, however, when the thickness of the second conductive layer 102 is more than 1 micrometer, the visual difference caused by the height difference is relatively obvious, and the visual effect is influenced. Therefore, in this embodiment, the second auxiliary conductive structure 1022 is disposed in the non-functional area of the thin film sensor shown in FIGS. 3 and 5, and because the patterns of the second auxiliary conductive structure 1022 and the second conductive structure 1021 are the same, thicknesses of film layers in the functional area and the non-functional area may be the same, and a height difference is prevented from being generated at the boundary between the functional area and the non-functional area, so that a height difference of the second light-shielding layer 104 is prevented from being generated at the boundary between the functional area and the non-functional area, and a visual difference is avoided, thereby improving the visual experience of the user. In this embodiment, the second auxiliary conductive structure 1022 may be disposed in the non-functional area, and may not be connected to the second conductive structure 1021, so that the material of the second auxiliary conductive structure 1022 in the second conductive layer 102 may be a metal material such as aluminum, copper, or molybdenum, or other materials without conductive property, which is not listed here.

Figure 8:
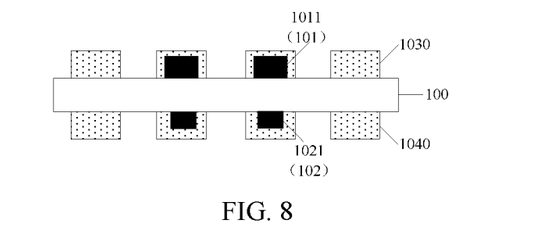
FIG. 8 is a schematic cross-sectional view of a structure of the thin film sensor shown in FIG. 3 taken along line B-B.
Figure 9:
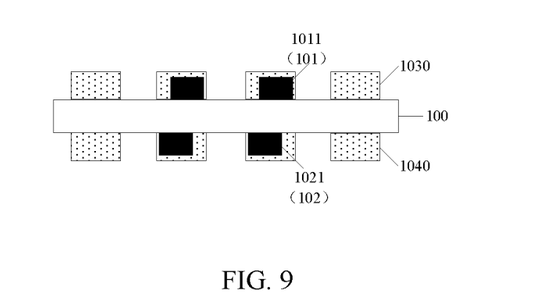
FIG. 9 is a schematic cross-sectional view of a structure of the thin film sensor shown in FIG. 3 taken along line B-B.

In some implementations, as shown in FIGS. 8 and 9, orthographic projections of the first light-shielding layer 103 and the second light-shielding layer 104 on the dielectric substrate 100 completely coincide, and orthographic projections of the first conductive layer 101 and the second conductive layer 102 on the dielectric substrate 100 both fall within the orthographic projection of the first light-shielding layer 103 on the dielectric substrate 100.

It should be noted that, orthographic projections of the first light-shielding layer 103 and the second light-shielding layer 104 on the dielectric substrate 100 completely coincide, so that no matter viewing towards the first surface of the dielectric substrate 100 or towards the second surface of the dielectric substrate 100, only one of the first light-shielding layer 103 and the second light-shielding layer 104 can be observed, that is, only the first light-shielding structure 1030 or the second light-shielding structure 1040 can be observed, since the structures of the first light-shielding layer 103 and the second light-shielding layer 104 in the functional area and the non-functional area are the same, light transmittance in the functional area and the non-functional area of the thin film sensor can be more uniform, and therefore, there is no obvious difference in visual effect between the functional area and the non-functional area, and the visual experience of the user can be improved. In practical applications, orthographic projections of the first conductive layer 101 and the second conductive layer 102 on the dielectric substrate 100 are within the orthographic projection of the first light-shielding layer 103 on the dielectric substrate, so as to completely shield the first conductive structure 1011 and the second conductive structure 1021. In a case where widths of the first conductive structure 1011 and the second conductive structure 1021 are different, a width of the first light-shielding structure 1030 should be larger than a wider one of widths of the first conductive structure 1011 and the second conductive structure 1021, so as to completely shield both the first conductive structure 1011 and the second conductive structure 1021. In a case where the first conductive structure 1011 and the second conductive structure 1021 are not disposed exactly facing to each other and have a certain misalignment therebetween, the width of the first light-shielding structure 1030 should be greater than a width of a region where the first conductive structure 1011 and the second conductive structure 1021 are located, so as to completely shield the first conductive structure 1011 and the second conductive structure 1021. In some implementations, a width of one side of the first light-shielding structure 1030 is generally greater than the width of the first conductive structure 1011 by 0.5 micrometers to 3 micrometers, so that the first light-shielding layer 103 can completely cover the first conductive layer 101, so as to avoid exposing part of the first conductive layer 101 to affect the visual effect. The second light-shielding structure 1040 and the second conductive structure 1021 need to be disposed similar to the first light-shielding structure 1030 and the first conductive structure 1011 described above, and will not be described in detail herein.

Figure 10:
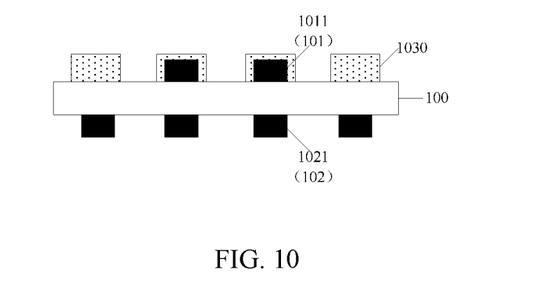
FIG. 10 is a schematic structural diagram of a thin film sensor according to an embodiment of the present disclosure.

FIG. 10 is another schematic structural diagram of a thin film sensor provided in an embodiment of the present disclosure, and as shown in FIG. 10, the second conductive layer 102 in the thin film sensor includes: a second conductive structure 1021 arranged in the functional area and the non-functional area; the second conductive structure 1021 has the same pattern as the first conductive structure 1011, i.e., both the second conductive structure 1021 and the first conductive structure 1011 are of a grid line structure. In this embodiment, a part of the second conductive structure 1021 in the functional area is electrically disconnected from another part of the second conductive structure 1021 in the non-functional area; and breakpoints are disposed at a portion of positions of the second conductive structure 1021 in the non-functional area, so that the part of the second conductive structure 1021 in the non-functional area is guaranteed to be broken off, and the part of the second conductive structure 1021 in the non-functional area cannot transmit a current, thereby avoiding interference to signals in the part of the second conductive structure 1021 in the functional area.

In the embodiment of the present disclosure, the second conductive structure 1021 of the second conductive layer 102 may be disposed in the functional area and the non-functional area, that is, completely covers the second surface of the dielectric substrate 100, so that there is no difference in visual effect between the structures of the functional area and the non-functional area, it is not required to provide the second light-shielding layer 104 to shield the second conductive structure 1021, and then it is unnecessary to provide the second auxiliary conductive structure 1022, so that the structure is simple, the number of process steps is reduced, and the manufacturing cost is reduced.

Figure 11:
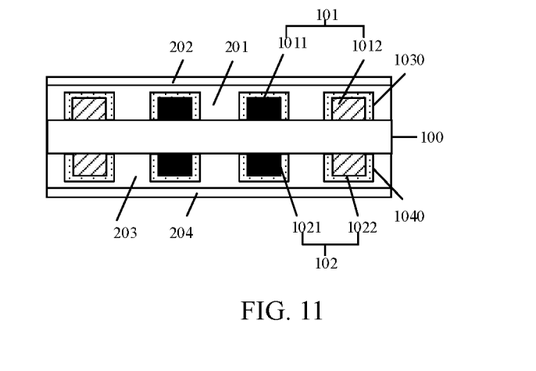
FIG. 11 is a schematic structural diagram of a thin film sensor according to an embodiment of the present disclosure.

In some implementations, as shown in FIG. 11, the thin film sensor further includes: a first planarization layer 201 located on a side, away from the dielectric substrate 100, of the first light-shielding layer 103; a first protective layer 202 located on a side of the first planarization layer away from the dielectric substrate 100; a second planarization layer 203 located on a side of the second conductive layer 102 away from the dielectric substrate 100; and a second protective layer 204 located on a side of the second planarization layer away from the dielectric substrate 100.

Here, the first planarization layer 201 may be made of an organic material such as a resin, so as to planarize the first light-shielding layer 103 and protect the first light-shielding layer 103. The second planarization layer 203 may also be made of an organic material such as resin, so as to planarize the second conductive layer 102 and protect the second conductive layer 102. It is understood that a second light-shielding layer 104 may further be provided on a side of the second conductive layer 102 away from the dielectric substrate 100, and in this case, the second planarization layer 203 may planarize the second light-shielding layer 104 and protect the second light-shielding layer 104. The first protective layer 202 may be made of a hard material to protect the first planarization layer 201. The second protective layer 204 may also be made of a hard material to protect the second planarization layer 203.

In a second aspect, an embodiment of the present disclosure provide a thin film sensor array, where the thin film sensor array includes a plurality of thin film sensors each provided as described above, and first conductive layers in the thin film sensors are coupled, and second conductive layers in the thin film sensors are coupled, so that areas of the first conductive layer and the second conductive layer can be enlarged to improve the signal transmission performance. The implementation principle and the technical effect of the thin film sensor array may refer to the above description of the implementation principle and the technical effect of the thin film sensor, and are not described herein again.

In a third aspect, an embodiment of the present disclosure further provides an electronic device, which may be an electronic device with a thin film sensor, such as a mobile phone, a tablet computer, an electronic watch, a sports bracelet, and a notebook computer. The electronic device may also be automobile glass, glass of rail transit vehicle, building glass and the like integrated with the thin film sensor. The implementation principle and the technical effect of the electronic device may refer to the above description of the implementation principle and the technical effect of the thin film sensor, and are not described herein again.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

The invention claimed is:

1. A thin film sensor having a functional area and a non-functional area surrounding the functional area, wherein the thin film sensor comprising:
   a dielectric substrate having a first surface and a second surface which are disposed opposite to each other;
   a first conductive layer located on the first surface of the dielectric substrate, the first conductive layer comprising a first conductive structure disposed in the functional area;
   a second conductive layer located on the second surface of the dielectric substrate; and
   a first light-shielding layer located on the first surface of the dielectric substrate, and the first light-shielding layer comprises a first light-shielding structure at least disposed in the non-functional area, wherein the first light-shielding structure has the same pattern as the first conductive structure,
   wherein the first conductive layer further comprises a first auxiliary conductive structure located in the non-functional area, the first auxiliary conductive structure is disconnected from the first conductive structure, and the first auxiliary conductive structure has the same pattern as the first conductive structure; the first light-shielding structure covers the first conductive structure and the first auxiliary conductive structure, and breakpoints are provided in at least a portion of positions in the first auxiliary conductive structure;
   the second conductive layer comprises a second conductive structure arranged in the functional area and a second auxiliary conductive structure arranged in the non-functional area, patterns of the second conductive structure and the second auxiliary conductive structure each are the same as the pattern of the first conductive structure, the second auxiliary conductive structure is disconnected from the second conductive structure, and breakpoints are arranged in at least a portion of positions of the second auxiliary conductive structure;
   the thin film sensor further comprises a second light-shielding layer located on the second surface of the dielectric substrate, and the second light-shielding layer comprises a second light-shielding structure at least arranged in the non-functional area, wherein the second light-shielding structure has the same pattern as the second conductive structure; and the second light-shielding structure covers the second conductive structure and the second auxiliary conductive structure; and wherein
   orthographic projections of the first light-shielding layer and the second light-shielding layer on the dielectric substrate are completely coincident, and orthographic projections of the first conductive layer and the second conductive layer on the dielectric substrate both fall within the orthographic projection of the first light-shielding layer on the dielectric substrate.

2. The thin film sensor of claim 1, further comprising:
   a first planarization layer located on a side, away from the dielectric substrate, of the first light-shielding layer;
   a first protective layer located on a side, away from the dielectric substrate, of the first planarization layer;
   a second planarization layer located on a side, away from the dielectric substrate, of the second conductive layer; and
   a second protective layer located on a side, away from the dielectric substrate, of the second planarization layer.

3. A thin film sensor array, comprising a plurality of thin film sensors, each of which is as claimed in claim 1, arranged in an array.

4. The thin film sensor array of claim 3, wherein first conductive layers of the thin film sensors are connected together; and
   second conductive layers of the thin film sensors are connected together.

5. An electronic device, comprising the thin film sensor array of claim 3.

* * * * *